(12) United States Patent
Seetala (10) Patent No.: US 9,390,128 B1
(45) Date of Patent: Jul. 12, 2016

(54) DATASTORE FOR STORING FILE ACCESS EVENT DATA

(75) Inventor: Partha Seetala, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 341 days.

(21) Appl. No.: 12/762,192

(22) Filed: Apr. 16, 2010

Related U.S. Application Data (60) Provisional application No. 61/317,616, filed on Mar. 25, 2010.

(51) Int. Cl.
*G06F 7/00* (2006.01)
*G06F 17/30* (2006.01)

(52) U.S. Cl.
CPC ................................. *G06F 17/30433* (2013.01)

(58) Field of Classification Search
CPC ................................................ G06F 17/30433
USPC .......................................................... 707/781
See application file for complete search history.

(56) References Cited

U.S. PATENT DOCUMENTS

| | | | |
|---|---|---|---|
| 5,787,472 A * | 7/1998 | Dan et al. ...................... | 711/134 |
| 5,974,407 A | 10/1999 | Sacks | |
| 7,290,266 B2 * | 10/2007 | Gladstone et al. ............ | 719/318 |
| 7,320,006 B2 | 1/2008 | Bobbitt, III et al. | |
| 2003/0105745 A1 | 6/2003 | Davidson et al. | |
| 2004/0220980 A1 * | 11/2004 | Forster .......................... | 707/204 |
| 2006/0184529 A1 * | 8/2006 | Berg et al. .......................... | 707/8 |
| 2006/0190491 A1 | 8/2006 | Kuji | |
| 2007/0244877 A1 * | 10/2007 | Kempka ............................ | 707/5 |
| 2010/0251160 A1 * | 9/2010 | Shafi et al. ..................... | 715/772 |

OTHER PUBLICATIONS

Liming Meng, Xiaofei Xu, Huiyou Chang, Guangxi Chen, Mingzeng Hu and Sheng Li, "A Tree-Structured Database Machine for Large Relational Database Systems," Journal of Computer Science and Technology, vol. 2, No. 4, 1987, pp. 265-275.

* cited by examiner

*Primary Examiner* — Ajith Jacob
(74) *Attorney, Agent, or Firm* — Meyertons, Hood, Kivlin, Kowert & Goetzel, P.C.

(57) ABSTRACT

A computer system and method is disclosed for storing large volumes of event data. The system receives access event logs including indications of access events to files stored on a set of storage devices. Each indication includes respective values for a plurality of access event attributes. The system uses the indications to store multiple segment files, each corresponding to a respective subset of the indications. Each segment file stores data as multiple tiles, where each tile includes a compressed copy of those access event indications of the segment file that have a shared value for one of the access event attributes. Each tile is stored contiguously within a set of storage devices.

19 Claims, 8 Drawing Sheets

DATASTORE FOR STORING FILE ACCESS EVENT DATA

The present application claims the benefit of priority to U.S. Provisional Application No. 61/317,616, filed Mar. 25, 2010, the disclosure of which is incorporated by reference herein in its entirety.

BACKGROUND

Organizations often need to store and manage large amounts of digital data. Such data may belong to different users and/or be stored in different locations on various storage systems. To provide storage resources to the organization's users, an organization may utilize a storage area network (SAN), any number of different storage appliances (e.g., filers), and/or other means. For example, an organization may purchase and configure various commercially available filer appliances to provide storage for the organization's users to access from across a network.

In addition to storing and providing access to digital data, organizations often need to track, record, and/or analyze patterns of access to the stored data. For example, an organization may need to track access to conform to government regulations, to implement charge-back based on actual usage, to identify owners of given content, or for performing various other functions.

To track data access patterns, organizations may implement a data access tracking system. For example, a traditional access tracking system may collect access event logs from different filers (e.g., using filer-specific APIs) and record the events in a traditional, general-purpose database, such as a managed relational database. Once the events are stored in the database, an administrator can use various querying mechanisms (e.g., relational database management system—RDBMS) to query the database for data. For example, a traditional RDBMS may allow the administrator to query the data using a query language, such as SQL.

One shortcoming of storing large volumes of data access events in a traditional database is performance. The amount of access event data that an organization tracks can grow very quickly over time. As the amount of grows, performance limitations of traditional databases can make querying, indexing, and/or otherwise maintaining the data prohibitively expensive and/or slow.

SUMMARY

A system receives access event logs from a set of storage devices. The access event data includes indications of access events to files stored on the set of storage devices and each indication includes respective values for a plurality of access event attributes. The system uses the indications to store multiple segment files, each segment file corresponding to a respective subset of the indications. Each segment file stores data as multiple tiles, where each tile includes a compressed copy of those access event indications of the segment file that have a shared value for one of the access event attributes. Each tile is stored contiguously within a set of storage devices.

In some embodiments, the system may be configured to detect an invocation of a function of a query API, the query including one or more query constraints. In response to they query, the system may locate and return data that matches the query constraints from the plurality of segment files.

In some embodiments, storing the indications may include, for each of the segment files, determining access event attribute values included in the subset of indications stored in the segment file and updating a lookup database to associate the determined values with the segment file.

In some embodiments, the system may normalize the received indications of access events.

In some embodiments, the access event logs may be received from a first set of storage devices by an indexer program in response to the indexer program querying the storage devices using one or more respective query APIs of the storage devices.

In some embodiments, the plurality of access event attributes may include identifiers selected from the group consisting of: a user identifier of a user performing an access event, a file identifier of a file accessed during the access event, an operation-type identifier of a type of operation performed during the access event, and a timestamp indicating a time at which the access event occurred.

In some embodiments, each of the segment files may correspond to a respective unique period of time, where the respective subset of the access event indications stored in each of the segment files occurred during the respective, unique period of time for that segment file.

In some embodiments, the respective compressed copy stored in each of the tiles may include a time interval index comprising an indication of an interval of time and a corresponding offset into the tile where data corresponding to one or more of the respective subset of indications that occurred during the interval of time is stored.

In some embodiments, the respective compressed copy stored in each of the tiles may include one or more access event attribute values stored using an integer compression format.

In some embodiments, each tile includes multiple sub-tiles, each sub-tile including a compressed copy of those indications stored in the tile that have a shared value for another of the plurality of access event attributes.

In some embodiments, at least two tiles in a given segment file may each store compressed data corresponding to the same one of the access event indications, where the access event attributes include a user identifier and a file identifier.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Storing large volumes of access event data in a traditional relational database system can be prohibitively slow and/or expensive. Querying, updating, indexing, and/or otherwise maintaining large volumes of event data in a traditional RDBMS can be prohibitively expensive and/or slow, involving many disk seek operations for common queries and/or insertions to the data. According to various embodiments, an access event indexer application may overcome such limitations, at least in part, by storing large volumes of access event data in a compressed and indexed format in an on-disk data store.

In various embodiments, the indexer may store event data on disk in a query-optimized format, that is, in an arrangement on disk that is dependent on various indices in the event data and is optimized for search and retrieval operations involving those indices. For example, data that is query-optimized according to a first index may be stored contiguously on disk according to values of that index. As used herein, data is said to be physically contiguous on a device such as a disk if it is stored on one or more physical portions of the device that are adjacent (e.g., track 0, sectors 1 and 2). Data can be said to be logically contiguous if the data is stored on adjacent logical portions of a disk (e.g., the last sector of track 0 of a disk and the first sector of track 1). In some instances, data can also be logically contiguous if it spans two or more platters of a disk drive (e.g., the last sector of the last track of a first platter and the first sector of the first track of a second platter). As used herein, the term contiguous refers to physical or logical contiguity. In some embodiments (e.g., when physical or logical contiguity is present), data may be stored in a manner that minimizes disk drive latency due to seek operations when reading the data. As described later, storing data contiguously may enable a query mechanism to locate desired data in the on-disk store more quickly (e.g., requiring fewer disk seek operations) than can a similar query mechanism searching a relational database.

In addition to being query-optimized, the data format utilized by the on-disk data store may compress the data. The compressed format of the data in the on-disk data store may have a higher information density than does event data in a traditional database (i.e., more event information per byte of data). Accordingly, given a particular disk drive with a maximum bandwidth constraint, a query mechanism may read larger volumes of relevant information more quickly from the on-disk data store than can a comparable mechanism from a traditional relational database stored on the same disk drive.

Figure 1:
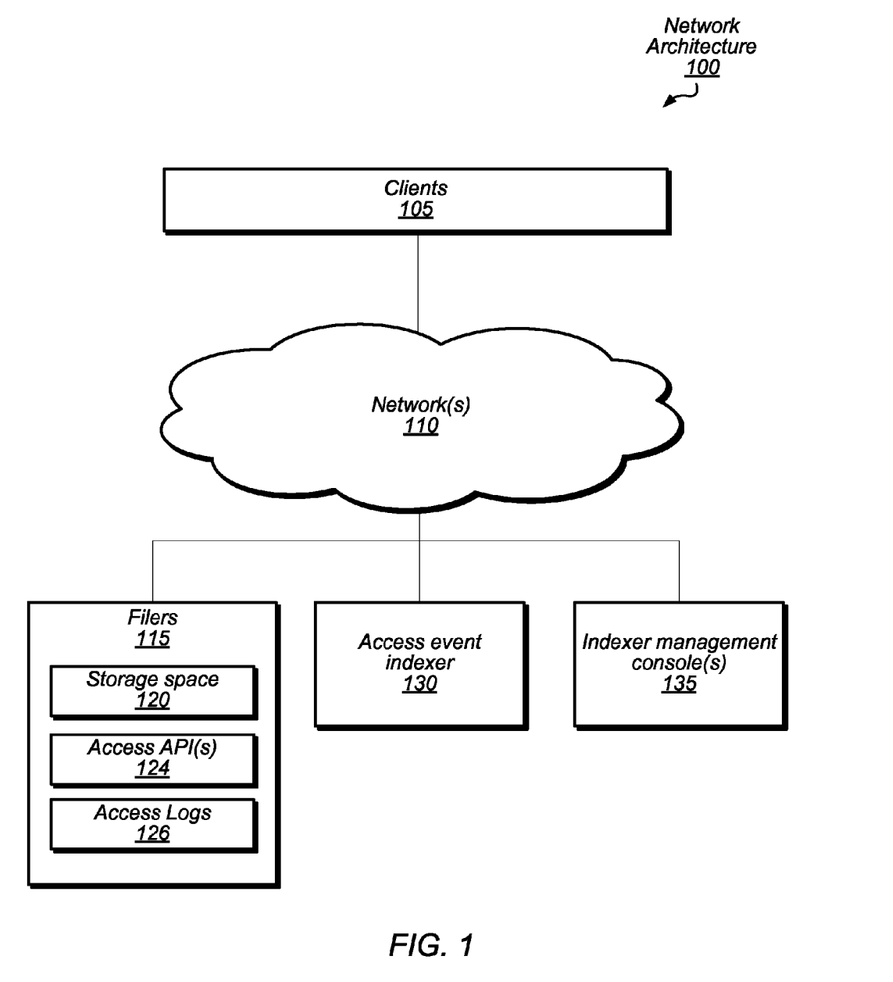
FIG. 1 illustrates a network architecture configured to perform access event indexing using an optimized on-disk data store, according to various embodiments.

FIG. 1 illustrates a network architecture configured to perform access event indexing using an optimized on-disk data store, according to various embodiments.

According to the illustrated embodiment, network architecture 100 includes a plurality of clients 105 connected to a plurality of filers 115 via one or more networks 110. Filers 115 may include various storage devices configured to provide clients 105 access to storage space 120 on filers 115. Filers 115 may include any number of separate computer servers supplying storage, for example implementing one or more distributed file systems (e.g., NFS), storage as a service, Network Attached Storage (NAS), backup storage, etc. In some embodiments, different filers 115 may correspond to different commercially available storage appliances, such as MICROSOFT SHAREPOINT servers, Windows NAS, NetApp filers, and/or various EMC storage utilities.

In some embodiments, different ones of filers 115 may expose respective access APIs 124 to clients 105. Access APIs 124 may expose functionality by which users on various ones of clients 105 may access storage space 120 on the respective filers.

In various embodiments, clients 105 may include any number of different clients that are configured to utilize storage resources 120 on one or more of filers 115. For example, clients 105 may include personal computers, servers, mobile devices, and/or other devices executing various software applications configured to interact with and access data stored on filers 115. Such software applications may include web browsers, rich stand-alone clients, operating system components such as file systems or mapped network drives, archiving systems, data loss prevention software, middleware applications and/or various other software programs configured to access filers 115 via access APIs 124 over networks 110. In various embodiments, networks 110 may include one or more communication networks, including combinations of packet-switched networks such as local area networks (e.g., Ethernet), wide-area networks (e.g., Internet), wireless networks, storage area networks, etc.

In different embodiments, clients 105 may enable particular users to access storage on various ones of filers 115. Such accesses may include performing different types of operations on files stored on filers 115. For example, filers 115 may be executable to enable a user of a client of 105 to create, read, write (i.e., modify), delete, and/or rename particular files. In some embodiments, filers 115 may implement various permissions policies governing access by different users of clients 105 to various files stored by filers 115.

A filer 115 may include storage space 120, which may be provided using one or more disk drives, solid-state memory drives, tape drives, RAID storage, and/or any other storage devices. In some embodiments, data in storage space 120 may be stored as files arranged in a directory structure of a file system. For example, in one embodiment, a filer of 115 may correspond to a storage appliance (e.g., NetApp filer) that stores data files in a directory structure, which may be mapped to a file system of a client 105 as a network drive.

Each of filers 115 may be executable to detect data access events (e.g., create, read, write, delete, rename etc.) affecting data stored by the filer and to record access event indications for each access. According to various embodiments, such access event indications may include a time of the access, an operation-type of the access (e.g., create, read, write, delete, rename, etc.), a user identifier of the user having performed the access, a filename of an accessed file, and/or other information. A filer may be configured to store such indications in one or more access logs, such as access logs 126. In different embodiments, access logs may be stored as files, in a database, in plain text, or in any other suitable format. Each access event log may include multiple event entries (i.e., event indications), each corresponding to a particular access event on the respective filer.

In various embodiments, access APIs 124 may include one or more interfaces for accessing a filer's access event logs. For example, a given filer may expose an API allowing an administrator program to query the filer for the filer's access event logs or for various events within those logs.

According to the illustrated embodiment, network architecture 100 includes access event indexer 130, which may be executing on a separate and/or dedicated computer server (e.g., a network appliance) and connected to network(s) 110. Access event indexer 130 may be configured to collect access event indications from filers 115, such as by collecting and parsing access logs 126 via access APIs 124. In some embodiments, access event indexer 130 may collect access logs from different filers using the respective access APIs of each filer. Indexer 130 may then read the retrieved logs to determine the access events indicated in those logs and update an optimized on-disk data store to reflect these access events. The optimized on-disk data store may store the data in a compressed and/or query-optimized (e.g., according to multiple indices) format.

In addition to maintaining an on-disk store of access event data, the indexer may also expose a query API that enables an administrator or another entity with sufficient permissions and capability to query the on-disk data store. For example, an administrator may use one or more indexer management consoles, such as 135, to retrieve access event data from the on-disk store according to different queries. Such consoles may correspond to software programs executing on one or more computers connected network(s) 110.

In some embodiments, such management consoles may also be used to configure one or more access event indexers, such as indexer 130. Configuring an access event indexer may include setting operation parameters, such as identifying the filer(s) from which the indexer should pull access event logs/indications, the maximum age of access events about which the indexer should track information, the access event attributes that the indexer should track regarding each event, the maximum size of the on-disk data store, the maximum number of events to catalog, the frequency at which the indexer should query the filers for access logs, indices by which to query-optimize the on-disk data store, or any other parameters governing the function of a given indexer.

Figure 2:
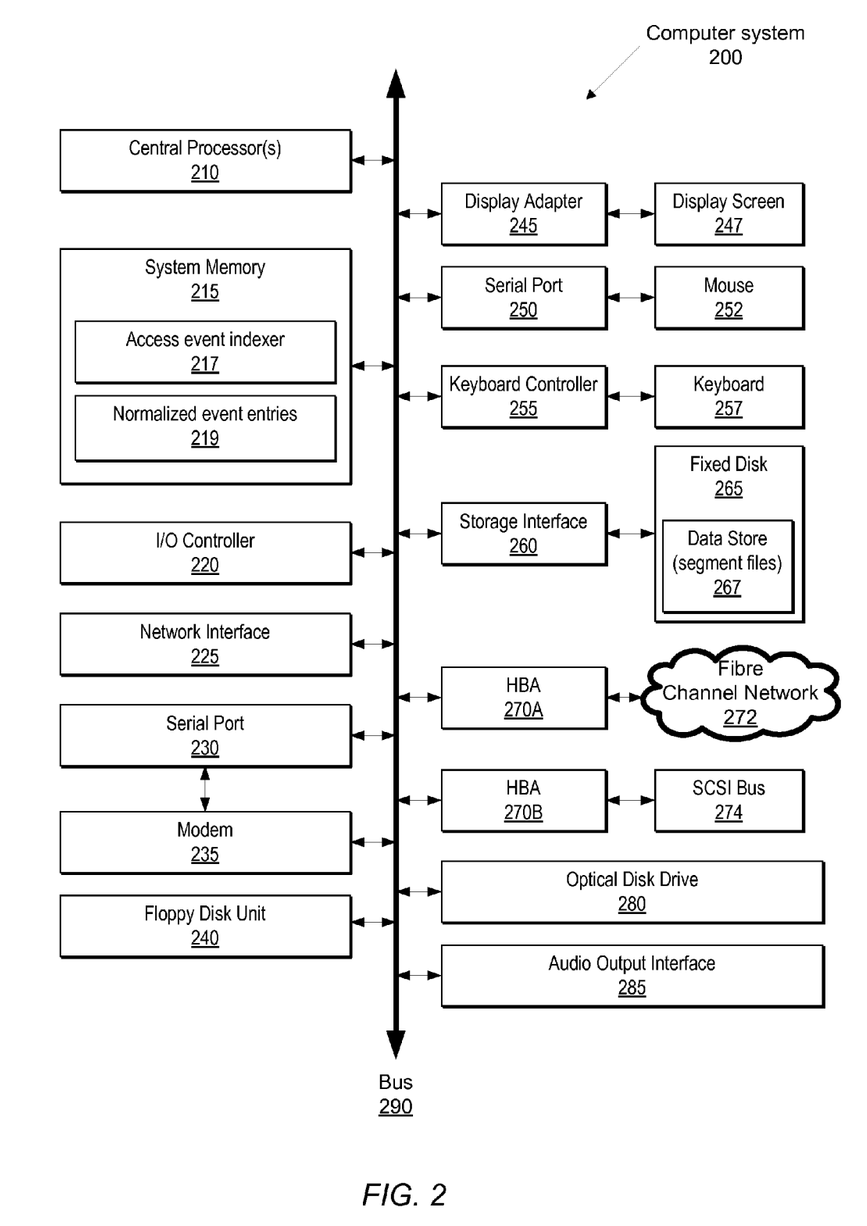
FIG. 2 depicts a block diagram of a computer system suitable for implementing an access event indexer with an optimized on-disk data store, according to various embodiments.

FIG. 2 depicts a block diagram of a computer system 200 suitable for implementing an access event indexer with an optimized on-disk data store, according to various embodiments. Computer system 200 includes a bus 290 which interconnects major subsystems of computer system 200, such as a central processor 210, a system memory 215 (typically RAM, but which may also include ROM, flash RAM, or the like), an input/output controller 220, an external audio device, such as a speaker system via an audio output interface 285, an external device, such as a display screen 247 via display adapter 245, serial ports 230 and 250, a keyboard 257 (interfaced with a keyboard controller 255), a storage interface 260, a floppy disk drive 240 operative to receive a floppy disk, a host bus adapter (HBA) interface card 270A operative to connect with a Fibre Channel network 272, a host bus adapter (HBA) interface card 270B operative to connect to a SCSI bus 274, and an optical disk drive 280 operative to receive an optical disk. The illustrated embodiment may also include a mouse 252 (or other point-and-click device, coupled to bus 290 via serial port 250), a modem 235 (coupled to bus 290 via serial port 230), and a network interface 225 (coupled directly to bus 290).

In some embodiments, bus 290 may allow data communication between central processor 210 and system memory 215, which may include read-only memory (ROM) or flash memory (neither shown), and random access memory (RAM) (not shown), as previously noted. The RAM may be the main memory into which the operating system and application programs are loaded. The ROM or flash memory can contain, among other code, the Basic Input-Output system (BIOS), which controls basic hardware operation such as the interaction with peripheral components. Applications resident with computer system 200 are generally stored on and accessed via a computer readable storage medium, such as a hard disk drive (e.g., fixed disk 265), an optical drive (e.g., optical drive 280), a floppy disk unit 240, or other storage medium. Additionally, applications can be in the form of electronic signals modulated in accordance with the application and data communication technology when accessed via network modem 235 or interface 225.

Storage interface 260, as with the other storage interfaces of computer system 200, can connect to a standard computer readable storage medium for storage and/or retrieval of information, such as a fixed disk drive 265. Fixed disk drive 265 may be a part of computer system 200 or may be separate and accessed through other interface systems. In some embodiments, fixed disk 265 may be used to store a compressed and/or query-optimized on-disk data store 267, as described herein.

Modem 235 may provide a direct connection to a remote server via a telephone link or to the Internet via an internet service provider (ISP). Network interface 260 may provide a direct connection to a remote server via a direct network link to the Internet via a POP (point of presence). Network interface 225 may provide such connection using wired and/or wireless techniques, including digital cellular telephone connection, Cellular Digital Packet Data (CDPD) connection, digital satellite data connection or the like. Network interface 225 may be used to connect the computer system to networks such as 110 of FIG. 1 and to one or more filers over that network.

Various other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application.

Code to implement various aspects of the present disclosure can be stored in computer-readable storage media such as one or more of system memory 215, fixed disk 265, optical disk 280, or floppy disk read by floppy disk unit 240. For example, system memory 215 may include code to implement access event indexer 217, which may correspond to access event indexer 130 of FIG. 1, which may be configured to query various filers and to store access event indications in an optimized format in an on-disk data store. In some embodiments, system memory 215 may further store access event indications collected from various filers and being processed for storage in on-disk data store 267. For example, access event indexer 217 may normalize access event indications from different filers into a uniform format and store such normalized access event indications, such as 219, in memory before transferring the indications to the on-disk data store 267 in batches.

In various embodiments, the operating system provided on computer system 200 may be any of various operating systems, including MS-DOS®, MS-WINDOWS®, OS/2®, UNIX®, Linux®, or another known operating system.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
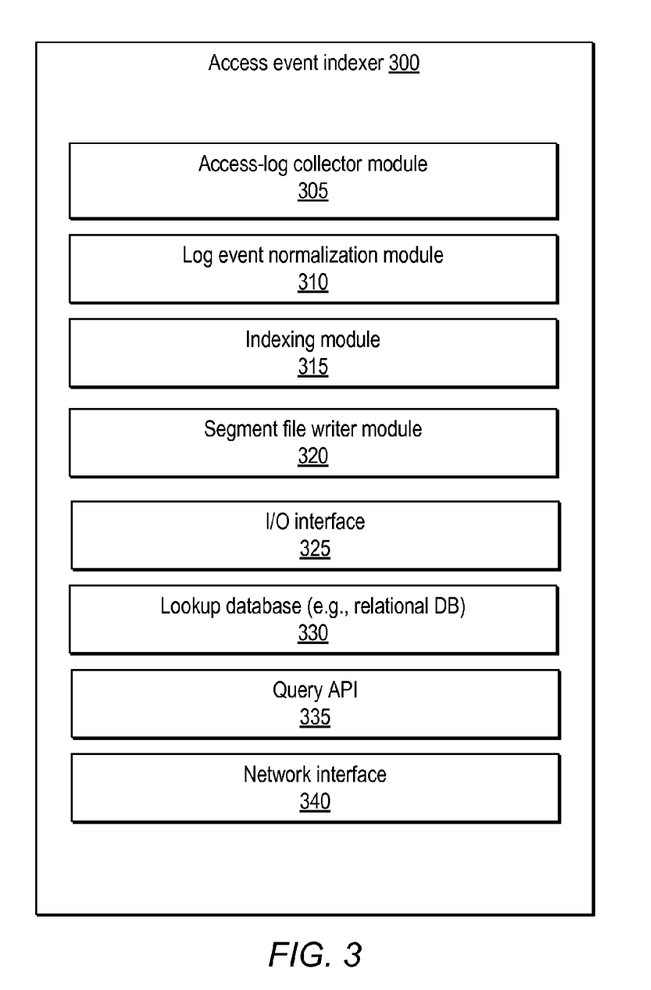
FIG. 3 is a block diagram illustrating the components of an access event indexer system, configured to track access events from one or more filers in an optimized on-disk data store, according to various embodiments.

FIG. 3 is a block diagram illustrating the components of an access event indexer system 300, configured to track access events from one or more filers in an optimized on-disk data store, according to various embodiments. Access event indexer 300 may correspond to indexer 130 of FIG. 1 and 217 of FIG. 2. In various embodiments, different ones of modules 305-340 may overlap and/or be separated such that access event indexer 300 includes fewer or additional components than shown in FIG. 3.

According to the illustrated embodiment, indexer 300 includes an access-log collector module 305. (As used herein, a module includes program instructions executable in a computer system memory; two modules may includes wholly or partially overlapping portions of program instructions in some embodiments.) Collector module 305 may be executable to collect access event indications from one or more filers on the network, such as via network interface 340. For example, collector module 305 may use network interface 340 to invoke filer-specific APIs to pull access event logs from different filers periodically. Such periodic collections may be referred to herein as collection cycles. In such embodiments, the collector module may collect multiple (e.g., thousands) of access event indications in each collection cycle. The collection module may store the collected event indications in a separate local file, which may include start and end timestamps corresponding to the earliest and latest event indications in the local file (e.g., these timestamps may be included among header information of the local file). In some embodiments, the collector module may store access event indications from multiple collection cycles into the same local file, which may be stored on disk or in dynamic memory.

In some embodiments, the event indications may be stored in the local file in a normalized format. That is, if different filers supply event indications to the collector module in respective formats (e.g., proprietary formats of the vendor that produces the filer), the collector module may utilize a log event normalization module, such as 310, to convert the disparate indication formats into the same (normalized) format. Thus, the access event indications stored in the local file may have a uniform format.

Once the collection module records a sufficient number of event indications in the local file, it may invoke an indexing module (e.g., 315) to create an in-memory sub-index of the data in the file. In some embodiments, the collection module may invoke the indexing module after collecting a given number of event indications, after performing a given number of collection cycles since the last invocation of the indexer, after collecting a given number of distinct event logs, or according to other criteria.

The indexing module may read the access event indications of the file and create an in-memory representation of the data in a compressed and optimized format, as described herein. The in-memory representation may be referred to herein as an in-memory sub-index and be optimized for search queries involving at least one of a particular set of access event attributes referred to herein as indices. For example, a sub-index may store the access event data in a format optimized for satisfying searches involving one or more of the event attributes of timestamps, usernames, and/or operation types. In this example, timestamps, usernames, and operation type event attributes may be considered indices. An example of an optimized file format is described in more detail below in relation to FIG. 6.

Once the in-memory sub-index contains a sufficient quantity of data, a segment file writer module (e.g., 320) may write the sub-index to a file on persistent storage (e.g., on disk). The written file may be referred to herein as a segment file and may be stored on disk in the same compressed and query-optimized format as the in-memory sub-index. In some embodiments, the segment file writer 320 may utilize an I/O interface, such as 325, to write the segment file to disk.

Once the segment file has been written to persistent storage, the event indexer may add the segment file to the on-disk data store by updating one or more relevant lookup tables in a lookup database, such as lookup database 330. In some embodiments, database 330 may be implemented as a relational database managed by a relational database management system (RDBMS).

In some embodiments, lookup database 330 may store information usable by a query API (e.g., 335) to identify and/or locate segment files that contain information relevant to given index values. For example, if the segment file writer creates a new segment file that includes information about accesses performed by a particular user (e.g., username "david"), then the system may update lookup database 330 to include an association between the particular username and the new segment file. In some embodiments, this association may be an entry in the relational database with the username as a key and the filename and/or path of the new segment file as a field of the entry. In various embodiments, the indexer may update the database to indicate relationships between the new segment file and particular values of usernames, operation types, time periods, filenames, and/or of other access event attributes contained in the new segment file. When a querying program subsequently attempts to locate information relevant to particular event attribute values, the program may perform a lookup in database 330 and determine which of the segment files contain relevant information.

In the illustrated embodiment, access event indexer 300 includes query API 335, which may expose various functions/methods for querying the data store. For example, in some embodiments, query API 335 may expose various functions that a client program may invoke to identify segment files that contain information relevant to a particular query. Such functions may expose information in lookup database 330 to the client in an explicit or transparent manner. Query API 335 may include various functions by which a client program may parse segment files to locate relevant data within each file.

In various embodiments, the query API may comprise a client library that abstracts and/or aggregates functionality, such that client programs executing queries against the data store may do so more simply. For example, query API 335 may include functions that accept a query in given query language and transparently responds to the query, such as by transparently parsing the query, interacting with lookup database 330 to identify relevant segment files, locating and parsing the segment files to identify relevant access event data, and constructing and returning one or more data structures containing the event data requested by the received query. In various embodiments, query API 335 may expose and/or abstract various levels of data store implementation detail.

Figure 4:
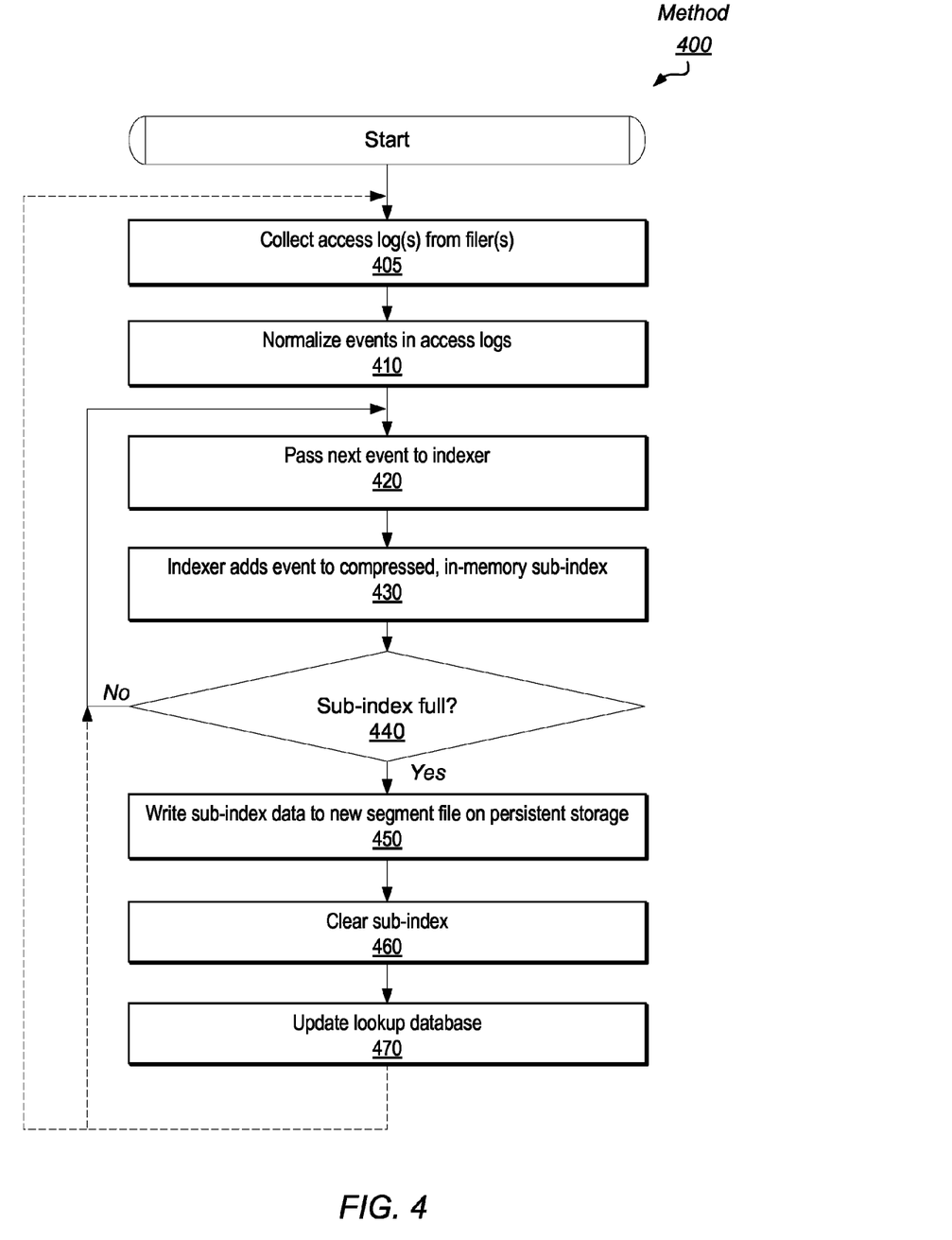
FIG. 4 is a flow diagram illustrating a method for tracking access events from one or more filers in an optimized on-disk data store, according to various embodiments.

FIG. 4 is a flow diagram illustrating a method for tracking access events from one or more filers in an optimized on-disk data store, according to various embodiments. The illustrated method may be performed by an access event indexer, such as indexer 300 of FIG. 3. In some embodiments, the indexer may be executing as software on a dedicated network appliance.

According to the illustrated embodiment, method 400 begins when the indexer collects one or more access logs from one or more filers, as in 405. The collection 405 may correspond to a collection cycle in which the indexer queries the one or more filers for access event logs (a.k.a., audit logs). The indexer may utilize various, filer-specific access APIs to retrieve the access logs from the filers. In some embodiments, each the collection process may be configured to collect events in each cycle that occurred during a discrete contiguous interval of time corresponding to the collection cycle.

In some embodiments, the indexer may invoke access APIs of given filers to retrieve only a subset of access event indications that are of interest to the indexer. For example, the indexer may use an access API of a given filer to retrieve only those event indications corresponding to access events that occurred subsequent to a previous collection cycle. In some embodiments, the event indications collected in a given collection cycle may be stored in a separate file with an indication of the earliest and latest access event timestamps.

According to method 400, the indexer may normalize the collected access events, as in 410. Normalizing the events may comprise transforming event indications collected from different filers from disparate filer-specific formats into a uniform format.

Figure 5:
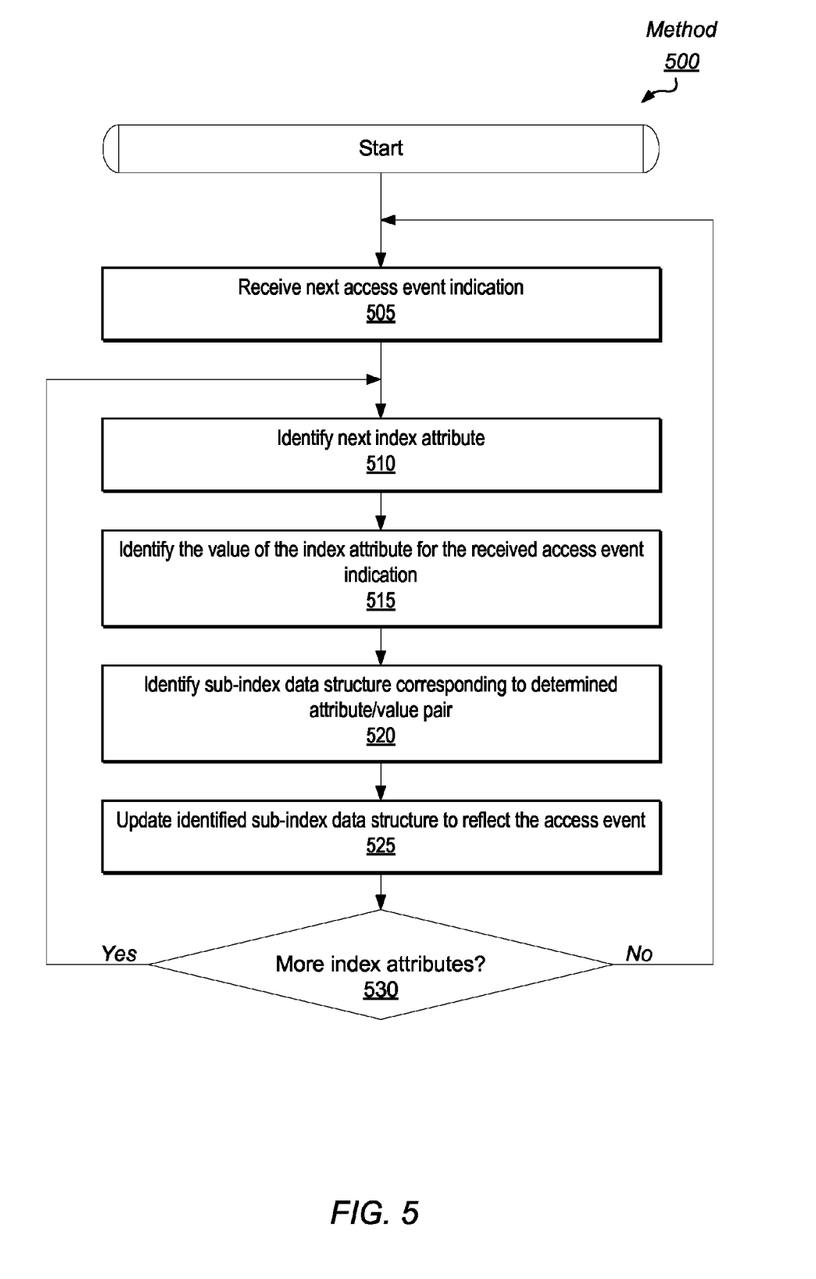
FIG. 5 is a flow diagram illustrating a method for adding an access event indication to an in-memory sub-index, according to some embodiments.

The indexer may then ingest the collected events as illustrated in 420-470. For example, each event may be passed to an indexing process, as in 420, which may add the event to a compressed, in-memory sub-index, as in 430 and as described in relation to FIG. 3 above. A detailed embodiment of a method for adding an event to the sub-index is illustrated by FIG. 5, and described in more detail below. The sub-index may be stored in a highly compressed and query-optimized format according to various access event attributes designated as indices. An example of such a format is discussed below in relation to FIG. 6.

As the indexing process adds more event indications to the sub-index, the indexing process may decide whether the sub-index is full, as in 440. In various embodiments, the indexing process may determine that the sub-index is full if it contains a given number of event entries, occupies a given amount of memory space, contains event entries from a given number of access event logs or from a given number of collection cycles, etc.

While the sub-index is not full, as indicated by the negative exit from 440, the indexing process continues to ingest more collected access events, as indicated by the feedback loop from the negative exit from 440 to 420. In some instances, the feedback loop may return to 405 to fetch additional access logs and/or access events indications.

Once the indexing process ingests a sufficient number of access events, it may determine that the sub-index is full, as indicated by the affirmative exit from 440. In response to determining that the sub-index is full, the indexing process may create a new segment file on persistent storage, and write the contents of the in-memory sub-index into the newly created segment file, as in 450

After writing a new segment file to persistent storage, the indexer may clear the in-memory sub-index (as in 460) and add the segment file to the data store by updating the lookup database, as in 470. As discussed above, updating the lookup database in 470 may include inserting entries into the database for each unique value of each index in the sub-index, so as to indicate an association between each value and the segment file.

In different circumstances, after the indexer updates the lookup database as in 470, it may ingest more access event indications by reading more entries from previously collected logs (as indicated by the optional feedback loop from 470 to 420) or by collecting additional logs with more entries (as indicated by the optional feedback loop from 470 to 405.

FIG. 5 is a flow diagram illustrating a method for adding an access event indication to an in-memory sub-index, according to some embodiments. In some embodiments, the method may be performed by an indexing process of an access event indexer as part of ingesting a normalized access event indication into the on-disk data store.

According to the illustrated embodiment, method 500 may begin when the indexing process receives an access event indication for ingestion, as in 505. The event indication may be an event from an access log that has been collected by a collector process of the indexer. In some embodiments, the access even indication may already be in a normalized format.

The indexing process may be configured to store the event data in the on-disk data store in format that is query-optimized according to multiple given event attributes, referred to herein as indices or index attributes. In different embodiments, the indexing process may be configured to store the event data according to multiple different index attributes. For example, in some embodiments, the index attributes may correspond to the event attributes username, filename, and operation type. In such an embodiment, the indexer may store the event data in a configuration on disk such that queries parameterized by username, filename, and/or operation type can be satisfied with lower disk overhead.

According to the illustrated embodiment, method 500 comprises performing steps 510-530 for each of the index attributes in a given event. In 510, the indexing process identifies the next index attribute. For example, if username, filename, and operation type are the index attributes, the indexing process may identify username as the next index attribute in 510.

In 515, the indexing process identifies the value of the index attribute determined in 510, for the access event indication received for ingestion in 505. For example, the indexing process may determine in 515 that the username attribute of the event indication is "david".

In response to determining the value of the index attribute, in 520, the indexing process may locate an in-memory sub-index data structure that is associated with the determined attribute/value pair (e.g., username/"david"). If no sub-index data structure corresponding to the attribute/value pair exists in the sub-index, identifying the target tile in 520 may comprise creating a new sub-index data structure corresponding to the attribute/value pair.

Once the indexing process has located the appropriate sub-index data structure, it may update the data structure to reflect the access event, as in 525. In some embodiments, updating the data structure may include storing the values of one or more others of the event attributes in the data structure. In various embodiments, the event data may be stored in the data structure in a complete (i.e., loss-less) or summarized (i.e., lossy) format. For example, in some embodiments, storing the event attributes in a lossy format may include grouping access events occurring in the same time interval instead of storing the exact timestamp of each event. Various other lossy or loss-less storage schemes are possible.

According to method 500, to ingest an access event indication, the indexing process updates a respective sub-index data structure for each of the index attributes. That is, while more index attributes exist, as indicated by the affirmative exit from 530, the indexing process examines the value of the next index attribute for the event (as in 515), identifies the sub-index data structure corresponding to the determined attribute/value pair (as in 520), and updates the determined sub-index data structure (as in 525) to be associated with the other index attribute values of the event.

When the indexing process determines that it has ingested a sufficient quantity of event indications, it may write the in-memory sub-index to persistent storage (e.g., disk drive) as a segment file. As discussed above, the indexing process may write the segment file to disk in a compressed, query-optimized format, according to various embodiments.

Figure 6:
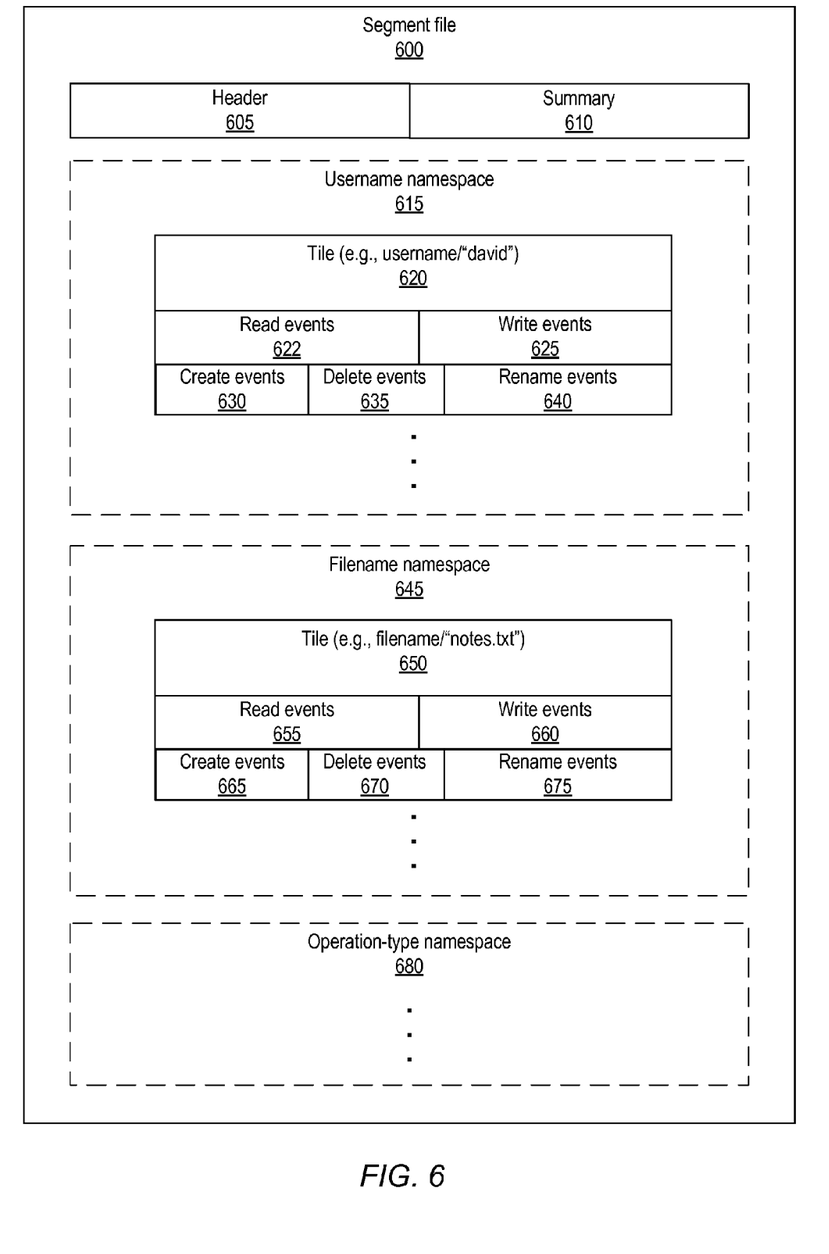
FIG. 6 is a block diagram illustrating the format of a compressed, query-optimized segment file, according to some embodiments.

FIG. 6 is a block diagram illustrating the format of a compressed, query-optimized segment file, according to some embodiments. The illustrated segment file may correspond to a segment file written in 450 of method 400. In the embodiment shown in FIG. 6, each component or subcomponent of the segment file may be understood as being stored in a physically contiguous region of disk or other persistent storage device. In other embodiments, the component/subcomponents of each segment file may be understood as being stored in a logically contiguous region of storage, stored in a manner that minimizes disk seek time, etc.

Segment file 600 includes a header 605, which in some embodiments, may store information indicating a date range that is covered by the events stored in segment file 600, and/or various meta-data about the file. Segment file 600 may also include a summary section 610, which may include aggregate statistics for the events within the date range (e.g., total number of files deleted, most active user, etc.). The segment file 600 may also include some number of namespaces, each storing the event access data in a format query-optimized for a different index attribute.

In order to service queries along each index attribute quickly, a segment file may redundantly store the event access information in different arrangements, each arrangement being query-optimized for a different one of the index attributes. For example, a first arrangement of the data may be query-optimized for queries by filename while another may be query-optimized for queries by username. Each arrangement may be referred to herein as a namespace. In FIG. 600, for example, segment file 600 includes a username namespace 615, a filename namespace 645, and an operation-type namespace 680. Each namespace stores the access event data in an arrangement that is query-optimized for locating and/or retrieving data with given usernames, filenames, and/or operation-types respectively.

Each namespace comprises a plurality of tiles, each corresponding to a given event attribute/value pair in the sub-index. For example, tile 620 in username namespace 615 corresponds to the username "david" and stores a copy of attributes of the access events with the username "david". In some embodiments, this information may correspond to that stored in the sub-index data structure corresponding to the attribute/value pair username/"david".

In the illustrated embodiment, namespace 615 may include a respective tile for every unique username value in the sub-index. Each tile may be stored on a contiguous region of disk. Thus, the tiles of username namespace 615 comprise data describing all of the access events in the sub-index, arranged in a query-optimized format by username. That is, for a given username, all of the events with that username are stored contiguously on disk in the segment file. Therefore, retrieving all event data corresponding to a given user from the segment file may require fewer seek operations than if the data were stored non-contiguously.

In the illustrated embodiment, filename namespace 645 may include a respective tile for every unique filename value in the sub-index, where each tile is stored on a contiguous portion of disk. Thus, the tiles of the filename namespace 645 comprise data describing all of the access events in the sub-index, arranged in a query optimized format by filename and therefore, retrieving event data for a given filename requires fewer seek operations than if the data were stored non-contiguously. In the illustrated embodiment, operation-type namespace 680 performs a similar function for operation-types.

In some embodiments, each tile may store the event data in a compressed format. Thus, the amount of storage space required to store the data may be less than that required by storing the data in an uncompressed format and the information density of the stored data increases, such that fewer bits must be read from disk to satisfy a given query.

In different embodiments, different compression techniques may be utilized. For example, in some embodiments, an access event may comprise a filename, username, operation-type, and timestamp. However, if the event is stored in a tile corresponding to a given filename (e.g., the 650 corresponding to "notes.txt"), then the tile may compress the event data by storing the filename only once for all of the events in the tile. This reduces the amount of space needed to store the event.

In some embodiments, the event data may be further compressed by not repeating the operation-type for every event. For example, each tile (e.g., 620, 650) may be arranged such that event indications are grouped by type into contiguous sub-tiles. For instance, read events by user "david" may be grouped together into sub-tile 622 while read events of file "notes.txt" may be grouped together in sub-tile 655.

Since every event in a sub-tile pertains to the same operation-type, the operation-type identifier may appear once for the entire group in each sub-tile and need not be repeated for every event indication. For example, in some embodiments, read-events sub-tile 622 of tile 620 may be stored as follows:

$$\text{ReadOpId} => \{(fn\_1,ts\_1),(fn\_2,ts\_2)\ldots(fn\_n,ts\_n)\} \quad (1)$$

where "fn" corresponds to a file name and "ts" corresponds to a timestamp.

In this arrangement, the operation-type identifier (ReadOpId) appears only once for the entire sub-tile, even though the sub-tile contains multiple event indications. Each event indication indicates that user "david" read a file with operation-type fn_x at time ts_x respectively.

In another example of reducing the number of operation identifiers, read-events in sub-tile 655 of tile 650 may be stored as follows:

$$\text{ReadOpId} => \{(\text{user}\_1, ts\_1), (\text{user}\_2, ts\_2) \ldots (\text{user}\_n, ts\_n)\} \qquad (2)$$

where "user" refers to a username (e.g., "david") and "ts" refers to a timestamp.

In various embodiments, write, create, delete, rename, and/or other types of operations may be stored in respective sub-tiles, such as sub-tiles 625-640 and/or sub-tiles 660-675.

In some embodiments, the event data in a segment file may be further compressed by not storing every timestamp value for every event. This may be accomplished by grouping events into timeslices (e.g., 15 minute intervals). By grouping events into timeslices, each sub-tile need only store one timestamp per timeslice rather than a respective timestamp for each unique event indication. For example, in some such embodiments, sub-tile 622 may be stored as:

$$\text{ReadOpId} => \{[ts\_1:fn\_1,fn\_2],[ts\_2:fn\_3]\ldots\} \qquad (3)$$

If the data of example (3) were stored in tile 620 (which corresponds to username "david"), then the data may be interpreted as indicating at least three distinct read events performed by user "david", including two read operations, each respectively accessing files fn_1 and fn_2 in a time interval corresponding to timestamp ts_1 (e.g., the 15 minutes following ts_1) and another read operation accessing file fn_3 during a time interval corresponding to timestamp ts_2.

In some embodiments, the format of data in a sub-tile may be further optimized for queries involving time ranges. In some embodiments, such optimization may be accomplished by adding a timestamp index correlating timestamps with offsets in the data. For example, in some embodiments, the data in example (3) may be formatted as follows:

$$\text{timestamp\_index} -> \{ts\_1:\text{offset}\_1, ts\_2:\text{offset}\_2 \ldots\}$$

$$\text{ReadOpId} => \{[fn\_1,fn\_2],[fn\_3]\ldots\} \qquad (4)$$

In example (4), timestamp_index correlates each timestamp (ts_1, ts_2, etc.) with an offset in the ReadOpId index. The offset may be used by a query engine (e.g., query API 335 of indexer 300) to locate a set of events within the ReadOpId index that corresponds to a given interval. For example, offset_1 may correspond to an offset into the ReadOpId index where the set of events [fn_1, fn_2] are stored. These events (to files fn_1 and fn_2) were therefore performed in the timeslice corresponding to ts_1. For example, the timeslice may correspond to a 15 minute interval starting at time ts_1. Likewise, offset_2 may correspond to an offset into ReadOpId index where the set of access events [fn_3] is stored. The data therefore indicates that this access event (to file fn_3) was performed during the timeslice corresponding to ts_2. Thus, a read event sub-tile, such as 622, may store multiple event indications using a compressed, query-optimized format.

Each sub-tile (e.g., 622-640) of a given tile (e.g., tile 620) may include a respective timestamp_index and operation index for that operation type of the sub-tile. The sub-tiles of different namespaces may store different attributes dependent on the namespace. For example, while sub-tiles in a username namespace may store data in a format such as (4), sub-tiles in a filename namespace (e.g., 645) and those in an operation-type namespace (e.g., 680) may store data in formats (5) and (6) respectively:

$$\text{timestamp\_index} -> \{ts\_1:\text{offset}\_1, ts\_2:\text{offset}\_2 \ldots\}$$

$$\text{ReadOpId} => \{[\text{user}\_1, \text{user}\_2],[\text{user}\_3]\ldots\} \qquad (5)$$

$$\text{timestamp\_index} -> \{ts\_1:\text{offset}\_1, ts\_2:\text{offset}\_2 \ldots\}$$

$$\text{ReadOpId} => \{[<fn\_1,\text{user}\_1>,<fn\_2,\text{user}\_2>],[<fn\_3,\text{user}\_3>]\ldots\} \qquad (6)$$

In some embodiments, data in the data store may be further compressed by storing the integer values themselves in a compressed format. For example, various byte integer compression techniques, such as that of Williams and Zobel in "Compressing Integers for Fast File Access", The Computer Journal 1999 42(3):193-201. In some embodiments, such techniques may take advantage of the distribution of the integer values (e.g., Elias Gamma Code, Elias Delta Code, Fibonacci Code, Golomb and Rice Codes, etc.). For example, a Elias Gamma Code may be used to encode integers when smaller integer values are more probable since the code uses fewer bits to represent smaller numbers than it uses to represent higher numbers. Using such techniques, the system may minimize the number of bytes the data store uses to store values such as usernames, filenames, operation-types, timestamps, etc.

In some embodiments, the format of data in the data store may be further query-optimized by storing attribute values in each timeslice in ascending or descending order. For example, in (4) fn_1 and fn_2 may appear in alphabetical or numeric order and in (5), user_1 and user_2 may appear in alphabetical or numeric order.

In some embodiments, in addition to organizing the attribute values in at timeslice according to ascending or descending order, duplicate values within each timeslice may be removed. In some embodiments, data may be further compressed by encoding the ordered attribute values in teach timeslice according to a run-length delta encoding, such as is described by Witten et. al. in *Managing Gigabytes: Compressing and Indexing Documents and Images*, Morgan Kaufmann Publishing, San Francisco, ISBN 1-55860-570-3.

In various embodiments, using techniques described above, segment files may store event data in a highly compressed and query-optimized format that can be quickly searched to satisfy various queries.

Each segment file may contain information about access events that occurred within a given date/time range. In some embodiments, once created and committed to disk, a segment file may not be modified, but only read (to service queries) or permanently deleted (e.g., if the administrator determines that events from that date range no longer need to be tracked).

In some embodiments, multiple segment files spanning different date ranges may be merged to create a single segment file. During such a process, the segment files to be merged may be opened in read-only mode, a new consolidated segment file created, and the individual segment files may be deleted permanently from disk. Since segment files are never updated, they may not be corrupted due to failed partial writes.

Figure 7:
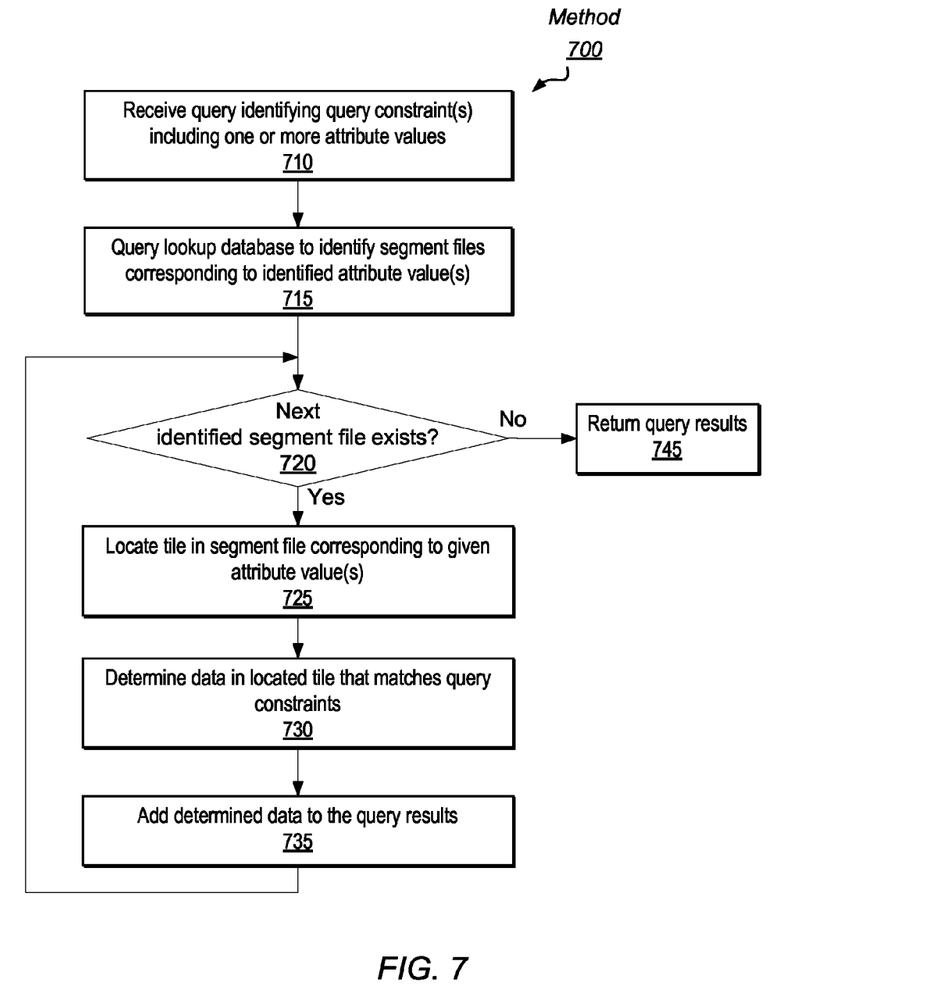
FIG. 7 is a flow diagram illustrating a method for querying an on-disk data store of storage access events, as described herein.

FIG. 7 is a flow diagram illustrating a method for querying an on-disk data store of storage access events, as described herein. Method 700 may be executed by one or more querying applications configured to utilize query API 335, by a client query library, by an implementation of query API 335 itself, and/or by various other programs configured to query the data store. For purposes of clarity, the embodiment of FIG. 7 is described below in terms of a query engine implementing a query API and performing method 700. However, it should be understood that various other programs may be configured to perform all or part of method 700.

According to the illustrated embodiment, query method 700 may begin when the query engine receives a query identifying one or more query constraints, as in 710. Query constraints may describe desired data and may include one or more event attribute values (e.g., events for username "david"), ranges of values (e.g., events in date range 4/15/09-1/1/10), thresholds (e.g., users with more than N write operations), and/or combinations of such constraints (e.g., events for username "david" in date range 4/15/09-1/1/10). In some embodiments, the constraints may include various logical operations for applying the values, ranges, and/or thresholds (e.g., users with more than N write operations excluding username "david"). In different embodiments, the received query may be encoded using a query language and/or may be specified using one or more invocations of the query API.

In response, the query engine may query the lookup database (e.g., 330) to identify one or more segment files corresponding to the identified attribute value(s) of the query. For example, if the query received in 710 corresponds to a request for "usernames of all users who accessed file 'notes.txt' between April $1^{st}$ and May 1, 2009," the query engine may use the lookup database to identify one or more segment files that contain data relevant to that date range and to the file 'notes.txt'.

If the lookup database indicates that no segment files contain information relevant to the query (as indicated by the negative exit from 720), the query may return a result set (as in 745) that is empty. Otherwise, if the lookup database indicates that one or more segment files contain information relevant to the query (as indicated by the affirmative exit from 720), then the query engine may extract the relevant data from each of the indicated segment files, such as by executing the loop of 725-735 for each segment file.

According to the illustrated embodiment, for each segment file, the query engine may locate the tile in the segment file corresponding to the attribute value indicated in the query, as in 725. For example, if the query is for users who accessed file "notes.txt", the query engine may identify the tile corresponding to the file "notes.txt" (e.g., the 650 of segment file 600). Such a file may be in a filename namespace of the segment file, such as namespace 645 of segment file 600.

According to the illustrated embodiment, the query engine may then determine data in the located tile that matches the query constraints, as in 730. For example, if the query is for write operations performed in a given timeslice, in 730, the query engine may read the timestamp index of the write sub-tile to determine an offset into the write sub-tile where the relevant information is stored. Once the offset is determined, the query engine may read the data at that offset and add the determined data to the query results, as in 735.

If another identified segment file exists (as indicated by the affirmative exit from 720), then the query engine may examine that segment file as well, such as by performing 725-735 for the new segment file, and add any relevant results from that segment file to the query results. Once no more relevant segment files exist, as indicated by the negative exit from 720, the query engine may return the query results to the invoking program and/or display the results to a user.

Figure 8:
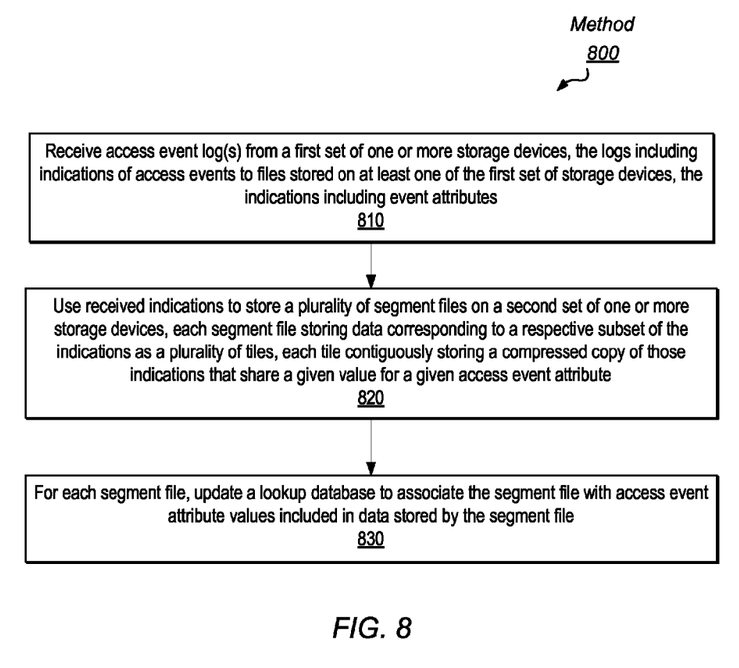
FIG. 8 is a flow diagram illustrating a method for creating an on-disk data store that is query optimized along various indices, according to some embodiments.

FIG. 8 is a flow diagram illustrating a method for creating an on-disk data store that may be query optimized along various indices, according to some embodiments. In some embodiments, method 800 may be performed by an indexer, such as access event indexer 300.

According to the illustrated embodiment, method 800 begins when the indexer receives one or more access event logs from a first set of one or more storage devices, as in 810. In some embodiments, this step may be performed by an access-log collector module, such as 305. As indicated in method 800, the logs may include indications of access events to files stored on at least one of the first set of storage devices and include event attributes (e.g., username, filename, operation-type).

As in method 800, the indexer may then use the received indications to store a plurality of segment files on a second set of one or more storage devices, as in 820. In some embodiments, this step may be performed by an indexing module (e.g., indexing module 315) in conjunction with a segment file writer module (e.g., segment file writer module 320). For example, the indexing module may create an in-memory sub-index and the segment file writer module may write the in-memory sub-index to disk storage.

As noted in method 800, each segment file may store data corresponding to a respective subset of the indications as a plurality of tiles, each tile contiguously storing a compressed copy of those indications that share a given value for a given access event attribute. For example, a first tile may store data corresponding to the indications that share the same username (e.g., "david") while another tile may store data corresponding to the indications that share the same filename (e.g., "notes.txt"), as shown in FIG. 6.

In step 830 of the illustrated embodiment, the system updates a lookup database for each segment file written in 820, to associate the segment file with access event attribute values included in data stored by the segment file. For example, if the segment file stores data corresponding to a set of one or more indications with the shared username "david", a lookup database may be updated in 830 to associate the username "david" with that given segment file.

In some embodiments, the lookup database may be a relational database. In such embodiments, updating the lookup database to correlate a segment file with a particular username may comprise inserting an entry into a username table in the lookup database. Such a table may include a username column and segment file column, such that an entry associates a given username with a given segment file by including the given username in the username column and a segment file identifier (e.g., file system file path) of the segment file in the segment file column. In different embodiments, different types of lookup databases and/or indication schemes may be used.

Various embodiments of techniques (described above) may include storing instructions and/or data implemented in accordance with the foregoing description in an article of manufacture such as a computer-readable storage medium, including various portions of system memory 215, fixed disk 265, optical disk drive 280, etc. Certain embodiments of these computer-readable storage media (which are tangible and non-transitory) may store instructions and/or data that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
a computer system receiving one or more access event logs from a first set of one or more storage devices, each access event log including access event records of access events to files stored on at least one of the first set of one or more storage devices, wherein each record includes one or more values for access event attributes; and
the computer system using the access event records to store a plurality of segment files on a second set of one or more storage devices, wherein a first of the plurality of segment files includes access event data from a subset of the access event records associated with access events occurring during a first interval, and wherein a second of the plurality of segment files includes access event data from a subset of the access events records associated with access events occurring during a second interval distinct from the first interval; and
wherein the access event data in the first segment file is arranged such that the access event data is able to be queried for a name of a user that accessed one or more of the files on the at least one storage device.

2. The method of claim 1, further comprising:
detecting an invocation of a function in a query API, the invocation including one or more query constraints;
in response to the detecting:
locating data from the plurality of segment files that matches the one or more query constraints; and
returning the located data to an invoker of the function.

3. The method of claim 1, further comprising:
determining, for one of the plurality of segment files, access event attribute values included in at least one access event record stored in the segment file; and
updating a lookup database to associate the determined access event attribute values with the segment file.

4. The method of claim 1, wherein the access event data includes a username and a timestamp for a user that accessed one of the files stored on the at least one storage device.

5. The method of claim 1, wherein the one or more access event logs are received from the first set of storage devices by an indexer program in response to the indexer program querying the first set of storage devices using one or more respective query APIs of the first set of storage devices.

6. The method of claim 1, wherein the access event attributes includes: a user identifier of a user performing an access event, a file identifier of a file accessed during an access event, an operation-type identifier of a type of operation performed during an access event, or a timestamp indicating a time at which an access event occurred.

7. The method of claim 1, wherein the first segment file includes a time interval index that includes a record of an interval of time and a corresponding offset into a tile where data corresponding to one or more access event records associated with the interval of time is stored.

8. The method of claim 1, wherein the first segment file includes one or more access event attribute values stored using an integer compression format.

9. The method of claim 1, wherein the first segment file includes access event data arranged such that the included access event data is searchable for a file name of one of the files on the at least one storage device.

10. The method of claim 1, wherein the first segment file includes access event data arranged for an operation-type namespace such that the included access event data is able to be queried for a particular operation type performed with respect to the files on the at least one storage device.

11. A computer-readable storage medium having stored thereon program instructions executable to cause a computer system to perform:
collecting one or more access event logs from a first set of one or more storage devices, wherein the one or more access event logs include access event records of access events to files stored on at least one of the first set of one or more storage devices, wherein each record includes one or more values for access event attributes; and
using the access event records in the access event logs to store a plurality of segment files, wherein a first of the plurality of segment files includes data collected from a subset of the access event records associated with access events occurring during a first interval, and wherein a second of the plurality of segment files includes data collected from a subset of the access events records associated with access events occurring during a second interval distinct from the first interval, wherein the collected data is distinct from data included in the files stored on the at least one storage device; and
wherein the data in the first segment file is arranged such that the data is searchable for a file name of one of the files on the at least one storage device.

12. The computer-readable storage medium of claim 11, wherein the program instructions are further executable to cause the computer system to perform:
determining access event attribute values included in at least one access event record stored in the first segment file; and
updating a lookup database to indicate an association between the determined access event attribute values with the first segment file.

13. The computer-readable storage medium of claim 11, wherein the access event attributes include a user identifier of a user performing an access event, a file identifier of a file accessed during an access event, an operation-type identifier of a type of operation performed during an access event, or a timestamp indicating a time at which an access event occurred.

14. The computer-readable storage medium of claim 11, wherein the data in the second segment file is arranged for an user-name namespace such that the data is able to be queried for a particular user name.

15. The computer-readable storage medium of claim 11, wherein the first segment file includes a compressed copy of one or more access event records.

16. The computer-readable storage medium of claim 11, wherein at least three separate tiles within the first segment file store compressed data corresponding to the same access event records.

17. A computer system, comprising:
a processor;
a memory storing program instructions executable by the processor to:
read one or more access event logs stored in a first set of one or more storage devices, each access event log including access event records of access events to files stored on at least one of the first set of one or more storage devices;
batch a first subset of the access event records corresponding to access events occurring during a first interval by storing a first segment file on a second set of one or more storage devices, wherein the first segment file includes access event data from the first subset, and wherein the access event data in the first segment file is arranged for an operation-type namespace such that the access event data is able to be queried for a particular operation type performed with respect to the files on the at least one storage device; and batch a second subset of access event records corresponding to access events occurring during a second interval by storing a second segment file on the second set of one or more storage devices, wherein the second segment file includes access event data from the second subset.

18. The computer system of claim 17, wherein the first segment file includes a plurality of tiles, wherein one of the plurality of tiles includes a plurality of sub-tiles, each sub-tile including a compressed copy of one or more access event records.

19. The computer system of claim 17, wherein storing the first segment file includes:

determining access event attribute values included in the first subset; and updating a lookup database to indicate an association between the determined access event attribute values with the first segment file.

\* \* \* \* \*